W. F. DAWSON.
BUCKET FASTENING MEANS FOR TURBINES.
APPLICATION FILED FEB. 19, 1916.
1,248,462.
Patented Dec. 4, 1917.
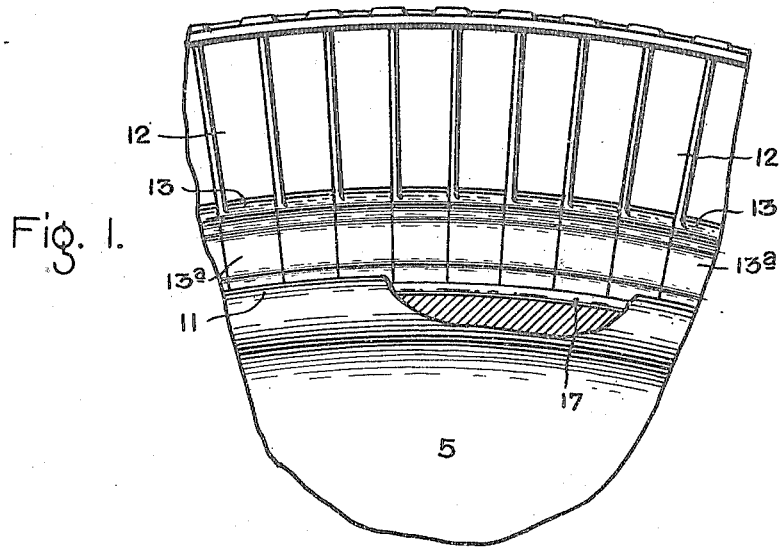
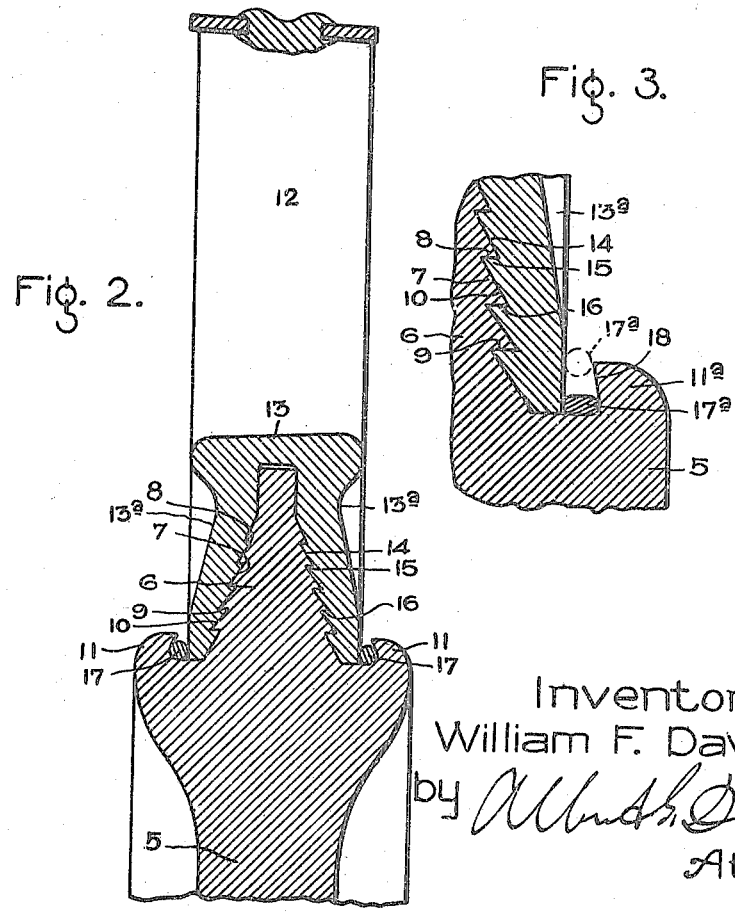
Inventor:
William F. Dawson,
by
Att'y.

UNITED STATES PATENT OFFICE.

WILLIAM F. DAWSON, OF LYNN, MASSACHUSETTS, ASSIGNOR TO GENERAL ELECTRIC COMPANY, A CORPORATION OF NEW YORK.

BUCKET-FASTENING MEANS FOR TURBINES.

1,248,462.   Specification of Letters Patent.   Patented Dec. 4, 1917.

Application filed February 19, 1916. Serial No. 79,449.

*To all whom it may concern:*

Be it known that I, WILLIAM F. DAWSON, a citizen of the United States, residing at Lynn, in the county of Essex, State of Massachusetts, have invented certain new and useful Improvements in Bucket-Fastening Means for Turbines, of which the following is a specification.

The present invention relates to bucket wheels for elastic fluid turbines and has for its object to provide an improved structure for attaching the bucket bases to the wheel rim.

For a consideration of what I believe to be novel and my invention attention is directed to the accompanying specification and the claims appended thereto.

In the accompanying drawing wherein I have shown an embodiment of my invention, Figure 1 is a side view of a portion of a bucket wheel; Fig. 2 is a radial sectional view showing the fastening means in section, and Fig. 3 illustrates a modification.

Referring to the drawing, 5 indicates a portion of the web member of a bucket wheel. The rim of the web member is provided with a tapered section 6 provided on opposite sides with a plurality of annular circumferential grooves or channels 7 which form ridges 8 having substantially straight inner faces 9 and sloping sides 10. The circumferential grooves 7 vary in depth from the inner one *i. e.* the one nearest the center of the wheel to the outer one, thus forming ridges of varying height. In section, as shown in Fig. 2, the ridges present the appearance of saw teeth. Any suitable number of ridges may be provided. In the present instance five are shown. 11 indicates circumferential locking or holding rings formed integral with the web adjacent the base of the tapering section 6. 12 indicates the buckets and 13 their bases. The base of each bucket preferably has its outer sides cut away as indicated at 13ª and is provided with a tapered slot forming two projecting legs, the inner surfaces of which have grooves 14 therein forming projections 15, the grooves and projections being formed to coöperate or interlock with the grooves 7 and channels 8 of the section 6, as will be clear from Fig. 2. The projections 15 have flat faces 16 which engage with the flat faces 9 of the ridges 8. The grooves 14 are preferably milled on a radius corresponding to the wheel radius. The radially inner portions of the legs of the bucket bases project down within the confines of the locking rings 11 and between such rings and the legs are inserted calking rings 17 which may be continuous around the wheel or made up in section. As shown in Fig. 2, after the calking rings 17 are in place a portion of the metal of the locking rings 11 is staked over so as to hold the calking rings 17 in position.

In Fig. 3 I have shown a modified arrangement wherein the locking rings 11ª are formed with inclined surfaces 18 and the calking rings 17ª after being inserted are flattened out to lock the bucket bases in position.

The above described structure has the advantage that the buckets can be assembled by pushing them radially into place, the proportions being such that the spring required will not exceed the elastic limit of the material so that the legs of the bucket bases will snap approximately into place. The bucket bases are cut away at 13ª by the desired amount to provide the needed flexibility. The locking rings 11 are spaced sufficiently far from the tapered section 6 to permit the legs of the bucket bases when sprung outwardly to slip into place. After the buckets are assembled on the wheel in this manner the insertion of the calking rings will force the legs toward the rim to bring the interlocking ridges fully into engagement and hold them there. Since the cross-section of the calking ring is small, it will not have high centrifugal force and hence but little staking over, as in Fig. 2, or flattening, as in Fig. 3, will be required in order to hold it in position. Since the permissible deflection of the legs of the bucket base is greatest toward the center of the wheel, I consider it preferable to graduate the depth of the grooves 7 and 14, those nearest the center of the wheel being the deepest and gradually becoming shallower toward the rim of the wheel as already described above.

In the ordinary turbine wheel construction having the usual dove-tail arrangement for fastening the buckets in place, it is necessary to leave one or more filling slots in the wheel rim through which the buckets are fed, the slots being filled by a locking piece after the buckets are all in place. At these points the two adjacent buckets are spaced an extra distance apart, or in other words, a bucket is missing. My improved arrangement avoids the use of filling slots and special locking pieces, and gives a solid continuous ring of buckets entirely around the wheel. It also has the advantage that owing to the tapered structure the stresses and the crushing pressures are evenly distributed and the greatest strength in each instance is provided at the points where it is most needed. This means that I am enabled to make a very substantial reduction in the weight of the bucket wheels by reason of the fact that the stresses in the buckets and wheel rim are so distributed that they are carried by the minimum amount of material. Both the bucket base and the wheel rim may be made considerably lighter and of lesser axial dimensions. This results, not only in a reduction in the cost of the wheel structures themselves, but also in the remainder of the turbine, since the length of the turbine is decreased owing to the decreased dimensions of the wheels and the weights to be carried on the shaft and in the bearings are also considerably decreased.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A bucket wheel for an elastic fluid turbine comprising a web member and a plurality of buckets, the rim of the web member being provided with a tapered section having a plurality of ridges on its opposite sides, and said buckets having tapered slots in their bases forming legs, said legs being provided on their inner surfaces with complementary ridges and being adapted to be forced radially into position on the wheel rim, locking rings carried by the wheel rim, and calking rings between said locking rings and the bucket bases, said calking rings acting to bring the legs firmly into interlocking position and hold them there.

2. A bucket wheel for an elastic fluid turbine comprising a web member and a plurality of buckets, the rim of the web member being provided with a tapered section having a plurality of ridges therein, said ridges diminishing in depth from the radially innermost to the outermost, and said buckets having tapered slots with complementary ridges therein and being adapted to be forced radially into position on the wheel rim, locking rims carried by the wheel rim, and calking rings between said locking rings and the bucket bases.

3. In an elastic fluid turbine, the combination of a rotor having a tapered rim with a plurality of ridges on opposite sides thereof, and buckets having slots in their bases forming projecting legs, said legs being provided on their inner surfaces with ridges adapted to interlock with the ridges on the rim, said buckets being adapted to be assembled on the wheel by placing the bucket bases radially over the rim with one leg on each side thereof, and means for squeezing the legs of the bucket toward the rim to bring the ridges into firm interlocking engagement and hold them there.

In witness whereof, I have hereunto set my hand this 18th day of February, 1916.

WILLIAM F. DAWSON.

Copies of this patent may be obtained for five cents each, by addressing the "Commissioner of Patents, Washington, D. C."